Nov. 28, 1967 K. LEHNER 3,354,504
APPARATUS FOR MELTING PLASTIC GRANULES
Filed Oct. 4, 1965 4 Sheets-Sheet 1

INVENTOR.
KARL LEHNER
BY
Bair, Freeman & Molinare
ATTORNEYS

Nov. 28, 1967  K. LEHNER  3,354,504
APPARATUS FOR MELTING PLASTIC GRANULES
Filed Oct. 4, 1965
4 Sheets-Sheet 2
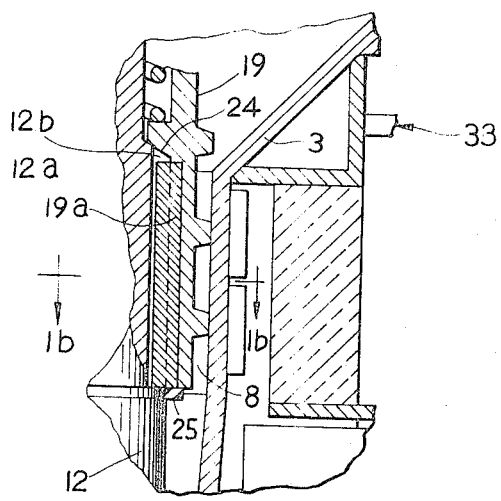
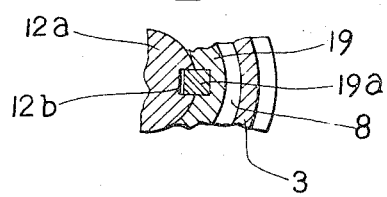
INVENTOR.
KARL LEHNER
BY
Bair, Freeman & Molinare
ATTORNEYS

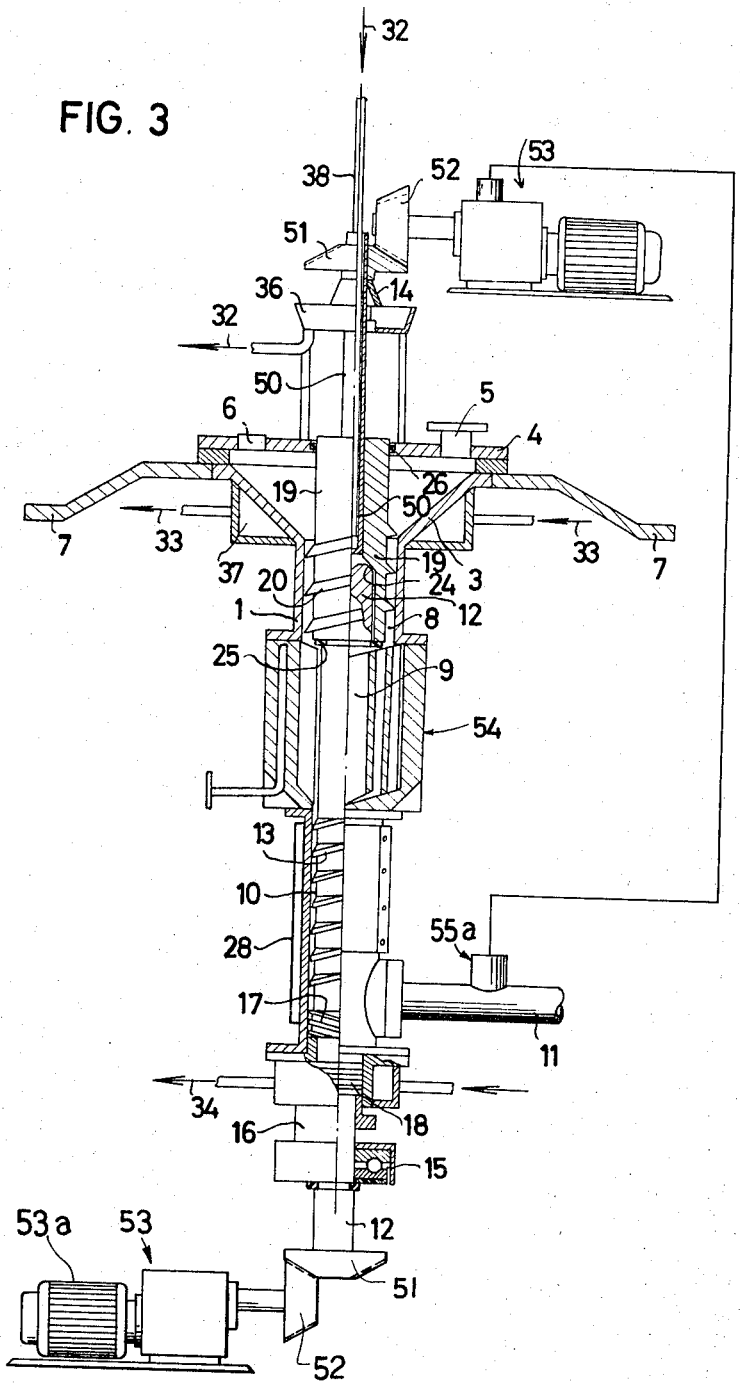

United States Patent Office 3,354,504
Patented Nov. 28, 1967

3,354,504
APPARATUS FOR MELTING PLASTIC GRANULES
Karl Lehner, Frankfurt am Main-Bonames, Germany, assignor to Vickers-Zimmer Aktiengesellschaft Planung und Bau von Industrieanlagen
Filed Oct. 4, 1965, Ser. No. 492,371
Claims priority, application Germany, Oct. 8, 1964, Z 11,115
7 Claims. (Cl. 18—8)

This invention relates to an apparatus for melting plastic granules, such as polyesters and the like.

Frequently there has been used for melting plastic granules a heated screw device to one end of which, called the entry zone, is fed solid granules. At the other end, called the measuring zone, molten material is withdrawn. It is essential that the melt leave the screw melter under constant pressure and temperature since usually the melt is fed directly to a spinning device. However, delivery at constant temperature, and especially constant pressure, is difficult despite the theoretically simple operation and control of a screw melter.

For regulation of varying conditions of state of plastic material as it progresses through a screw melter, melting screws are usually provided with control devices which, in response to melt temperature and pressure at the screw outlet, regulate screw temperature and/or screw turning rate. It has been proposed that the entire screw be mounted axially slidable in its housing and that there be provided a variable diameter screw outlet by which it is easier to maintain constant pressure in the melt. Such expedients still do not provide the necessary control to maintain constant outlet melt pressure.

One reason it is difficult to maintain constant melt pressure at the screw melter outlet is that molten thermoplastic materials do not behave like Newtonian liquids. Their flow characteristics vary depending upon molecular structure as well as pressure and temperature, and molecular structure is not always predictable. In addition, granulate material is generally conveyed along the screw into the measuring zone in an uncontrolled and nonuniform manner because such material is present in different physical states at various zones of the screw and, thus, has differing flow characteristics.

In the entry zone of the screw, the material is still essentially solid, while in the following melting zones it begins melting and in the final measuring zone, it is liquid. The effective volume of the solid material in the entry zone is normally about twice as great as the volume of the liquid melt. This means that during passage through the melting zone, the material must be compressed so that it will enter the measuring zone under constant pressure. The compression ratio required depends upon the frictional coefficient of the material, which changes considerably as the material moves along the screw.

The compression requirements of the melting material have been met by providing separate melting screw zones which have different lengths, housing diameters, and screwthread pitch and configuration. Compression ratios of the screw are empirically determined for particular plastic materials at particular feed rates. However, for a given screw design, varying feed rates still result in undesired pressure fluctuations which cannot be eliminated by the usual regulation of screw turning rate or screw axial position, since quantity of material transferred from the one zone to the next zone is not altered thereby.

It is the object of this invention to provide a melting screw device which obviates the difficulties of former devices. This is accomplished by a device wherein compression ratio varies and the entry zone is always fed exactly the amount of material which is being removed at the outlet. Such entry zone is a separate mechanical element slidably arranged with respect to the other screw zones and slides in response to melt pressure as hereinafter described.

In particular, the entry zone is arranged axially slidable on the screw axis and is biased against an adjustable compression spring. Upon an increase of liquid pressure in the melting zone above a predetermined maximum the slidable entry zone is automatically moved against the spring bias and the feed rate of granules is decreased. Alternatively, the inlet zone of the screw may be disposed rotationally slidable on the screw axis and may be connected to the rest of the screw by means of a pressure-dependent slip coupling. As a further alternative, the inlet zone may be provided with a separate drive means regulated by pressure at the liquid withdrawal zone of the screw.

In the drawings:

FIG. 1a is a partial vertical sectional detail of the spline assembly between the principal section and the axially slidable shell section of the melting screw of the embodiment of FIGS. 1 and 2.

FIG. 1b is a cross-sectional view through lines 1b—1b of FIG. 1a;

FIG. 3 shows in longitudinal section a third embodiment of the invention.

Figure 1:
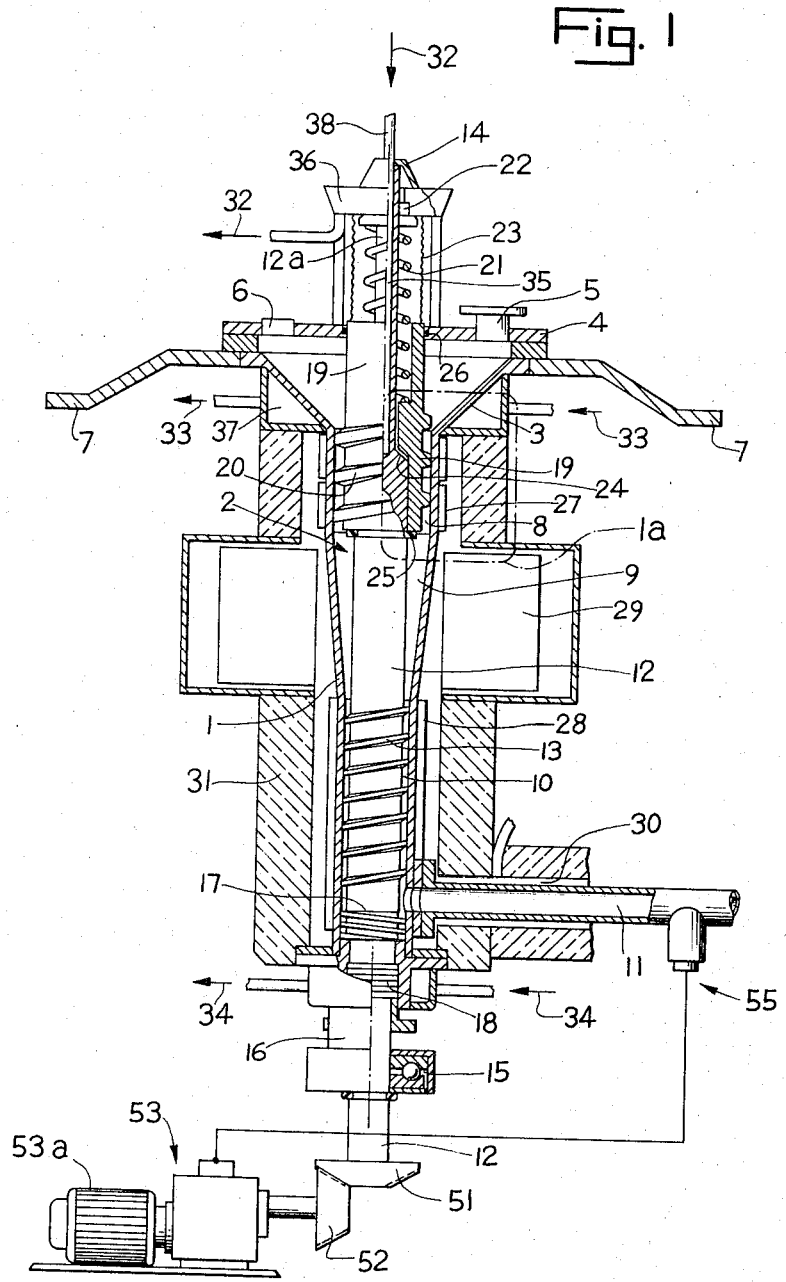
FIG. 1 shows in longitudinal section one embodiment of the invention.

In FIG. 1, vertical casing 1 houses a two-part melting screw 2. At its upper end casing 1 diverges to create a filling hopper 3 which is covered by cover plate 4 provided with opening 5 for filling and, if desired, a viewing glass 6. On casing 1, preferably at its upper end, are mounted support arms 7 by which the installation is supported on any convenient structure.

Directly beneath hopper 3 is entry zone 8, located between screw 2 and casing 1. Below zone 8, in the conveyance direction of the screw is melting zone 9. As shown in the embodiment of FIG. 1, screw 2 carries no threaded portion in zone 9. Below melting zone 9 is measuring zone 10 which terminates in outlet 11. Entry zone 8 and measuring zone 10 have successively decreasing volumes since granule material undergoes an effective volume decrease upon melting. Accordingly casing 1 is conically tapered in the area of the melting zone 9.

As already mentioned, screw 2 in constructed in two parts, a principal section 12 and an axially slidable shell 19. Principal section 12 carries threads or worm courses 13 in the region of measuring zone 10 and extends over the entire casing length. (Hereinafter, the terms "threads" and "worm courses" will be used interchangeably.) Section 12 protrudes at the upper end of casing 1 through an opening in cover plate 4 and also protrudes underneath measuring zone 10 out the lower end of casing 1. At its upper end, section 12 is supported by a bearing (not shown) housed by a bearing housing (not shown) attached to cover plate 4. At its lower end, section 12 is supported by pressure bearing 15 which, together with stuffing box 18, is accommodated in a common housing 16. To relieve fluid pressure on stuffing box 18 there is provided between passage 11 and the lower end of casing 1 several screw threads 17 on section 12 with pitch running counter to threads 13. This results in exertion of upward force on fluid at the entrance to passage 11 and the packing requirements of section 12 at the lower end of casing 1 are considerably simplified.

At inlet zone 8 and in hopper 3 there is placed on section 12 an axially slidable shell 19 which carries at its lower end, threads or worm courses 20. Shell 19 is spring biased in the direction of melting zone 9 by compression spring 21 which abuts at its upper end against pressure plate 22 carried by support piece 14. Between the lower end of shell 19 and support piece 14 there is provided as packing a folding bellows 23. To limit downward movement of shell 19, upper zone 12a of section 12 is of reduced diameter so that shoulder 24 is formed on which abuts a shoulder of complimentary shape formed internally of shell 19. As best seen in FIGS. 1a and 1b, shell 19 has at least one inwardly protruding projection 19a which mates with a complimentary longitudinal groove 12b of section 12 or 12a to ensure common rotary movement of shell 19 and section 12. Moreover, shell 19 is sealed at its lower end against section 12 by packing 25. A further packing 26 may be provided in cover plate 4 through which the upper end of shell 19 protrudes.

In the region of the three worm zones 8, 9 and 10, casing 1 is surrounded by various heating devices, which preferably are insulated by insulating envelope 31. A first heating means 27 which, for example, may be an electrical resistance heater is placed around casing 1 in the region of entry zone 8. Another heating device 28, similar to 27, surrounds casing 1 in the region of measuring zone 10. Finally, casing 1 is surrounded in the region of the melting zone 9 by a third heater 29, which in the embodiment of FIG. 1, is an induction heater. If worm section 12 has in the region of melting zone 9 a high magnetic permeability and casing 1 has a low magnetic permeability, an induction heating system is an especially simple way to achieve uniform heating of material in the melting zone. Alternatively, a finned heater with ribs extending into melting zone 9 may be used. In addition another heating jacket 30, preferably steam-heated and insulated, is placed around passage 11.

Besides the heating devices, screw 2 is also provided with various cooling-water circulation systems which are indicated schematically by arrow pairs 32, 33 and 34. Cooling water of circulation system 32 flows through plunger tube 38 into inner hollow space 35 in worm section 12 and 12a and flows off over discharge ring 36 mounted on support piece 14. Cooling water of circulation system 33 flows through cooling jacket 37 which is placed around filling hopper 3. Cooling water of circulation system 34 cools packing box 18.

At the lower end of the worm section 12, for example over a coupling, there is connected an angle-reducing gear assembly 51, 52, and over another coupling assembly 53 a drive motor 53a is connected. Further, regulating devices 55, 55a are provided which respond to fluid pressure in outlet passage 11 and provide a signal by which the turning rate of worm section 12 is controlled. All the above-mentioned means are well known in the art.

In operation of the above-described melting screw, solid plastic granules are supplied from a storage container above filling opening 5 into filling hopper 3. Granules are there engaged by threads or worm courses 20 mounted on shell 19 and, due to frictional resistance of the granules with the interior wall of the casing, are conveyed through entry zone 8 to melting zone 9. Heater 27 is not intended to melt the granules but only to increase frictional resistance of the granules on the inner wall of casing 1 by softening their external surface. Further increase of frictional resistance on casing wall 1 can be brought about by providing axial running grooves or splines (not shown) on the interior of the casing wall. Conversely, interior cooling of the worm in the region of the entry zone 8 serves to lower frictional resistance of the granules. Similarly, by cooling filling hopper 3, frictional resistance of the granules on the inside wall of filling hopper 3 is reduced.

From entry zone 8 the granules pass into the melting zone 9 wherein they are melted and undergo a reduction in effective volume. Molten plastic material is continuously forced by later-added material out of melting zone 9 into measuring zone 10 and finally removed through outlet passage 11. The above described process, as already pointed out, is regulated by devices 55, 55a which control the screw turning rate to aid in bringing about constant pressure conditions at outlet passage 11. Through corresponding temperature regulation, the temperature of the emerging liquid material is maintained constant.

Entry zone 8 is somewhat oversized but does not convey granules with its full power into melting zone 9. On the contrary, as soon as melting zone 9 is filled to a predetermined extent, shell 19 with worm courses 20 is shifted axially upward by fluid pressure exerted in melting zone 9. By such upward shift, the upper portion of worm courses 20 is moved out of zone 8 and granule input to melting zone 9 is decreased. The predetermined degree of filling of melting zone 9 at which axial shifting of shell 19 occurs depends on the downward pressure exerted by spring 21. Upon diminishing of the fluid pressure in melting zone 9 below the predetermined maximum, shell 19 lowers under the force of spring 21 and granules are again fed at the maximum rate to zone 9. Accordingly, therefore, the fluid pressure in melting zone 9 is maintained substantially constant which results in constant fluid pressure at outlet passage 11.

The downward force exerted by spring 21 may be varied depending upon the particular granulate material being melted and the other particular characteristics of the system. Those skilled in the art will recognize that various spring bias forces will be necessary depending on the details of a particular melting system. The particular spring force and force setting may be indicated by suitable indicating means (not shown), well known in the art and, if desired, a continuous record may be kept of spring readings versus time.

Various modifications can be made in the above-described embodiment of the invention. For example, it is not essential that the installation be vertically oriented. If desired, it can also be operated in horizontal disposition. Also, it is not essential that the drive for worm section 12 be engaged at the outlet end of the worm, although such arrangement has the advantage that the interior cooling of the worm can be carried out more easily in the entry zone and that, moreover, the relatively large and heavy drive parts of the apparatus need not be moved in case of disassembly of the worm. On the other hand, locating the drive means at the outlet end makes necessary a stuffing box for packing the worm which involves difficulties, since the fluid pressure on the outlet end acts on the relatively small surface of the relief courses.

As an alternative to providing an axially slidable spring biased shell, the entry section can be designed with a pressure-dependent slip coupling so that the entry section and the screw are axially fixed relative to one another but disengage rotationally upon attaining a predetermined pressure in the melting zone. In order to achieve this, only a few modifications need be made in the embodiment shown in FIG. 1, which modifications are represented in detail in FIG. 2. Elements in FIG. 2 functionally the same as those in FIG. 1 are provided with the same reference numbers.

Figure 2:
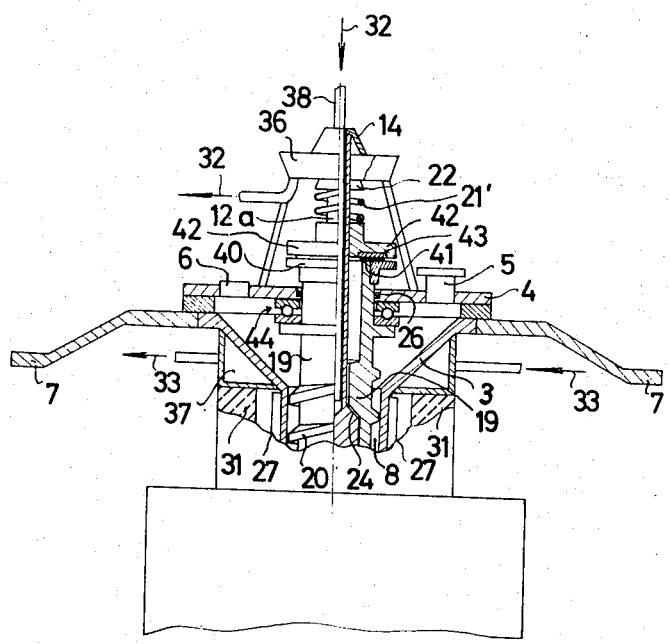
FIG. 2 shows in longitudinal section a second embodiment of the invention.

In the embodiment shown in FIG. 2, shell 19 has threads on worm courses 20 and is turnably borne on the worm section 12. To prevent axial movement between the parts as shown in FIG. 1, shell 19 is supported over a pressure bearing 44 against cover plate 4 of filling hopper 3. Moreover, shell 19 is extended beyond cover 4 and carries on its upper end a flange 40 which is covered with a suitable coupling lining 41. Directly above flange 40 is another flange 42 which is non-rotatably mounted and axially slidable on upper zone 12a of the worm section 12 and which is provided with counter-lining 43 which engages and interacts with coupling lining 41. Flange 42 is forced down by spring 21′ against flange 40. Spring 21′ is provided with means for adjustable bias similar to spring 21 in FIG. 1. Thus there results a frictional engagement between driven worm section 12 and shell 19, the degree of engagement depending on the desired predetermined extent of filling of melting zone 9.

Finally, rather than regulating the relative displacement of the entry portion by various spring bias means already described, there may be provided for the entry section a separate drive means independent of the drive means for the worm section which is controllable in response to pressure in the melting zone. This is illustrated in FIG. 3, in which again, for functionally similar parts, the same reference numerals are used.

As shown in detail in FIG. 3, there is eliminated the tapered upper region 12a shown in FIGS. 1 and 2. In FIG. 3, worm section 12 terminates at shoulder 24. The eliminated element 12a is replaced by hollow shaft 50 to which shell 19 is rigidly secured. Shell 19 extends over the top of worm section 12 between shoulder 24 and packing 25 so that parts 12 and 19 mutually locate and guide one another.

At its free upper end, hollow shaft 50 protrudes through support piece 14 and is secured to drive wheel 51. Drive wheel 51 acts in conjunction with counter-wheel 52 and drive unit 53 which is controlled in response to pressure in the melting zone 9 by pressure sensing and control means 55a well known in the art. Drive unit 53 can be regulated to react in response to the degree of filling desired in melting zone 9 between shell 19 and worm section 12.

It is pointed out that the embodiment of FIG. 3 uses for heating the melting zone 9 a finned heating star 54 such as was mentioned above in the description of FIG. 1.

Having described my invention, I desire that the scope thereof be limited solely by the appended claims.

I claim:
1. An apparatus for melting plastic granules comprising:
 a housing defining an elongated bore and comprising a filling hopper, a heated cylindrical entry zone, a tapered melting zone, and a heated cylindrical measuring zone serially disposed adjacent each other,
 a heated tube defining an outlet passage attached at an angle to the axis of said housing at one end thereof,
 a first screw mounted coaxially within the bore of said housing having worm courses for conveying plastic feed material from said hopper through said cylindrical entry zone to said tapered melting zone, said screw terminating at the boundary between said entry and melting zones,
 a second screw coaxially mounted within said housing, a first portion of said second screw having worm courses in the portion of the bore of said housing delineated by said measuring zone, for conveying melted plastic through said measuring zone to said outlet tube, and a second cylindrical portion of said second screw having no worm courses thereon disposed in said tapered melting zone, said second screw having a portion extending beyond an end of said housing,
 means for rotating said second screw in contact with said portion of said second screw extending beyond said housing,
 means for sensing the pressure of plastic material in said outlet passage,
 means linking said means for rotating said second screw with said sensing means for controlling the rate of rotation of said second screw,
 means for continuously controlling said first screw's rate of conveying of said plastic feed in said hopper through said entry zone to said melting zone responsive to pressure in said melting zone,
 whereby a continuous stream of liquid plastic under substantially constant predetermined pressure is extruded at said outlet passage.

2. An apparatus of claim 1 in which said means for continuously controlling said first screw's rate of conveying includes
 means linking said first screw to said second screw to provide a common drive for said first and second screw.

3. An apparatus of claim 2 in which said linking means includes
 means for moving said first screw axially in said entry zone in continuous response to the pressure in said melt chamber whereby the number of worm courses within said entry zone may be decreased progressively to zero or increased to a predetermined maximum.

4. An apparatus of claim 2 in which said second screw includes a third portion disposed coaxially within said first screw,
 said linking means includes means for non-rotatably mounting said first screw on said third portion of said second screw, so that said first screw does not rotate relative to said second screw but is axially slidable thereon, and spring means for biasing said first screw axially in the direction of said melting zone,
 whereby said first screw is free to move axially against said spring bias in continuous response to increase in fluid pressure above a predetermined maximum in said melting zone while rotating at a rate in response to the pressure in said outlet tube.

5. An apparatus of claim 4 in which
 said means for non-rotatably mounting said first screw on said third portion of said second screw consists of a spline coupling of meshing axial ribs and grooves.

6. An apparatus of claim 2 in which
 said second screw includes a third portion disposed coaxially within said first screw,
 and said linking means includes:
  first means mounted on said third portion of said second screw to rotate with said second screw while being axially slidable thereon, second means secured on said first screw, spring means for yieldingly biasing said first means toward said second means, said first, second, and spring means comprising a spring-biased slip coupling,
 whereby said first screw is rotationally displaced relative to said second screw in response to fluid pressure in said melting zone.

7. An apparatus of claim 9 in which
 said means for continuously controlling the rate of conveying of said first screw comprises means for driving said first screw independent of said means for driving said second screw, at a rate of rotation responsive to the fluid pressure in said melting zone.

References Cited

UNITED STATES PATENTS

| | | | |
|---|---|---|---|
| 1,533,191 | 4/1925 | Kaiser et al | 18—12 |
| 2,349,254 | 5/1944 | English et al | 18—12 |
| 2,370,469 | 2/1945 | Johnson et al | 18—12 |
| 2,731,247 | 1/1956 | Hudry. | |
| 2,747,224 | 5/1956 | Koch et al | 18—2 XR |
| 2,783,498 | 3/1957 | Richardson | 18—12 |
| 2,791,802 | 5/1957 | Weber | 18—8 |
| 3,110,930 | 11/1963 | Beck | 18—12 XR |

OTHER REFERENCES

German printed application of Siemens, February 1964.

WILLIAM J. STEPHENSON, *Primary Examiner.*